US006453843B2

United States Patent
Bescherer

(10) Patent No.: US 6,453,843 B2
(45) Date of Patent: Sep. 24, 2002

(54) WIRE MESH TUBULAR FEEDER

(75) Inventor: Robert E. Bescherer, Bristol, RI (US)

(73) Assignee: Aspects, Inc., Warren, RI (US)

( * ) Notice: Subject to any disclaimer, the term of this patent is extended or adjusted under 35 U.S.C. 154(b) by 0 days.

(21) Appl. No.: 09/782,263

(22) Filed: Feb. 13, 2001

Related U.S. Application Data

(60) Provisional application No. 60/182,799, filed on Feb. 15, 2000.

(51) Int. Cl.[7] ................................................ A01K 39/00
(52) U.S. Cl. .................................................... 119/51.01
(58) Field of Search ............................. 119/51.01, 52.1, 119/52.2, 52.4, 57.8, 57.9

(56) References Cited

U.S. PATENT DOCUMENTS

| | | | | | |
|---|---|---|---|---|---|
| 3,927,645 A | * | 12/1975 | Varner | ...................... | 119/51.01 |
| 4,434,745 A | * | 3/1984 | Perkins et al. | .............. | 119/57.9 |
| 5,195,459 A | * | 3/1993 | Ancketill | ................... | 119/52.3 |
| 5,479,878 A | * | 1/1996 | Coulter | .................... | 119/51.03 |
| 5,701,842 A | * | 12/1997 | Whittles | ..................... | 119/52.2 |
| 5,758,596 A | * | 6/1998 | Loiselle | ..................... | 119/52.2 |
| 5,826,539 A | * | 10/1998 | Bloedorn | .................... | 119/52.2 |
| 5,826,540 A | * | 10/1998 | Bridges | ..................... | 119/52.3 |
| 5,927,231 A | * | 7/1999 | Bloedorn | .................... | 119/52.2 |
| 5,970,913 A | * | 10/1999 | Bloedorn | .................... | 119/52.2 |
| 6,067,934 A | * | 5/2000 | Harwich | .................... | 119/57.8 |
| 6,073,582 A | * | 6/2000 | Lush | ....................... | 119/51.01 |
| 6,253,707 B1 | * | 7/2001 | Cote | ......................... | 119/57.9 |

* cited by examiner

Primary Examiner—Peter M. Poon
Assistant Examiner—Kevin Jakel
(74) Attorney, Agent, or Firm—Barlow, Josephs & Holmes, Ltd.

(57) ABSTRACT

An improved bird feeder includes a tubular main body having a top open end and a bottom open end. The tubular main body is made of wire mesh material. A bottom cap is attached to the bottom open end to enclose it. A tubular adapter sleeve is positioned in the top open end to protect and isolate the commonly sharp and dangerous top edge of the main body from the user. A top cap is removably positioned over the adapter sleeve to enclose the feeder to protect the feeder located therein. The adapter sleeve not only shields the user from a sharp and dangerous top edge of the mesh main body but also maintains the mesh main body in its original shape by avoiding flexing and bending of the mesh material of the main body.

8 Claims, 4 Drawing Sheets

WIRE MESH TUBULAR FEEDER

This non-provisional application claims the benefit of U.S. Provisional Patent Appplication Serial No. 60/182,799, filed Feb. 15, 2000.

BACKGROUND OF THE INVENTION

The present invention relates generally to bird feeders. More specifically, the present invention relates to bird feeders for dispensing peanuts, and the like. Such a bird feeder, commonly known as "peanut feeders", are well suited for providing feed to woodpeckers, nut hatches, chickadees and other similar birds.

Prior art peanut feeders typically include a tubular wire body with a top opening and a bottom opening. The wire body provided resilient and rugged containment for dispensing feed, such as peanuts. A bottom cap is affixed to the wire body at the bottom opening to support a perch. The bottom cap is typically secured to the wire body by fasteners, such as screws. Seed deflection inserts are commonly used to urge feed to the openings in the wire body. A top cap is provided to cover the top opening and a bail wire is used to hang the feeder. Typically, the wire body is quite flexible resulting in a feeder that may flex in an undesirable fashion, particularly when the feeder is grasped during the loading of new feed therein.

Further, the bottom and top openings are very sharp because they are simply exposed edges of bare metal wire material. Since the feeder must be periodically re-filled, the top cap is removed and replaced frequently. The bare edges and the flexibility of the wire makes replacing the cap difficult because precise alignment of the top cap and the top edge of the wire body is required. There is also a particular concern in the typically sharp exposed top edge of the wire body because the user may be easily cut by this bare wire body during re-filling or replacement of the top cap on the wire body.

In view of the foregoing, there is a demand for a peanut bird feeder that is safer to use than prior art feeders. There is a demand for a peanut bird feeder that is safer to re-fill with feed than prior art feeders. In addition, there is a demand for a peanut bird feeder that is rigid and less apt to flex into undesired configurations as prior art feeders do. There is a demand for a peanut feeder that facilitates the removal and installation of the top cap onto the wire feeder body.

SUMMARY OF THE INVENTION

The present invention preserves the advantages of prior art bird feeders. In addition, it provides new advantages not found in currently available feeders and overcomes many disadvantages of such currently available feeders.

The invention is generally directed to the novel and unique bird feeder. The present invention relates to a peanut type bird feeder that includes a main body made of wire mesh material.

The peanut bird feeder of the present invention includes a tubular fabricated wire main body having a top open end and a bottom open end. The tubular main body is made of wire mesh material and has a bottom edge at its bottom open end and a top edge at its top open end. A bottom cap is attached to the bottom open end to enclose it. A tubular adapter sleeve is positioned in the top open end to protect and isolate the commonly sharp and dangerous top edge of the main body from the user. A top cap is removably positioned over the adapter sleeve to enclose the feeder to protect the feeder located therein. The adapter sleeve not only shields the user from a sharp and dangerous top edge of the mesh main body but also maintains the mesh main body in its original shape by avoiding flexing and bending of the mesh material of the main body.

In accordance with the present invention, it is an object of the present invention to provide a peanut bird feeder that makes a bird feeder with a mesh body more safe.

It is therefore an object of the present invention to provide an improved peanut bird feeder that retains its shape.

It is an object of the present invention to provide an improved peanut bird feeder that is easier to use.

It is a further object of the present invention to provide an improved peanut bird feeder that is easier to open, fill with feed and close.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
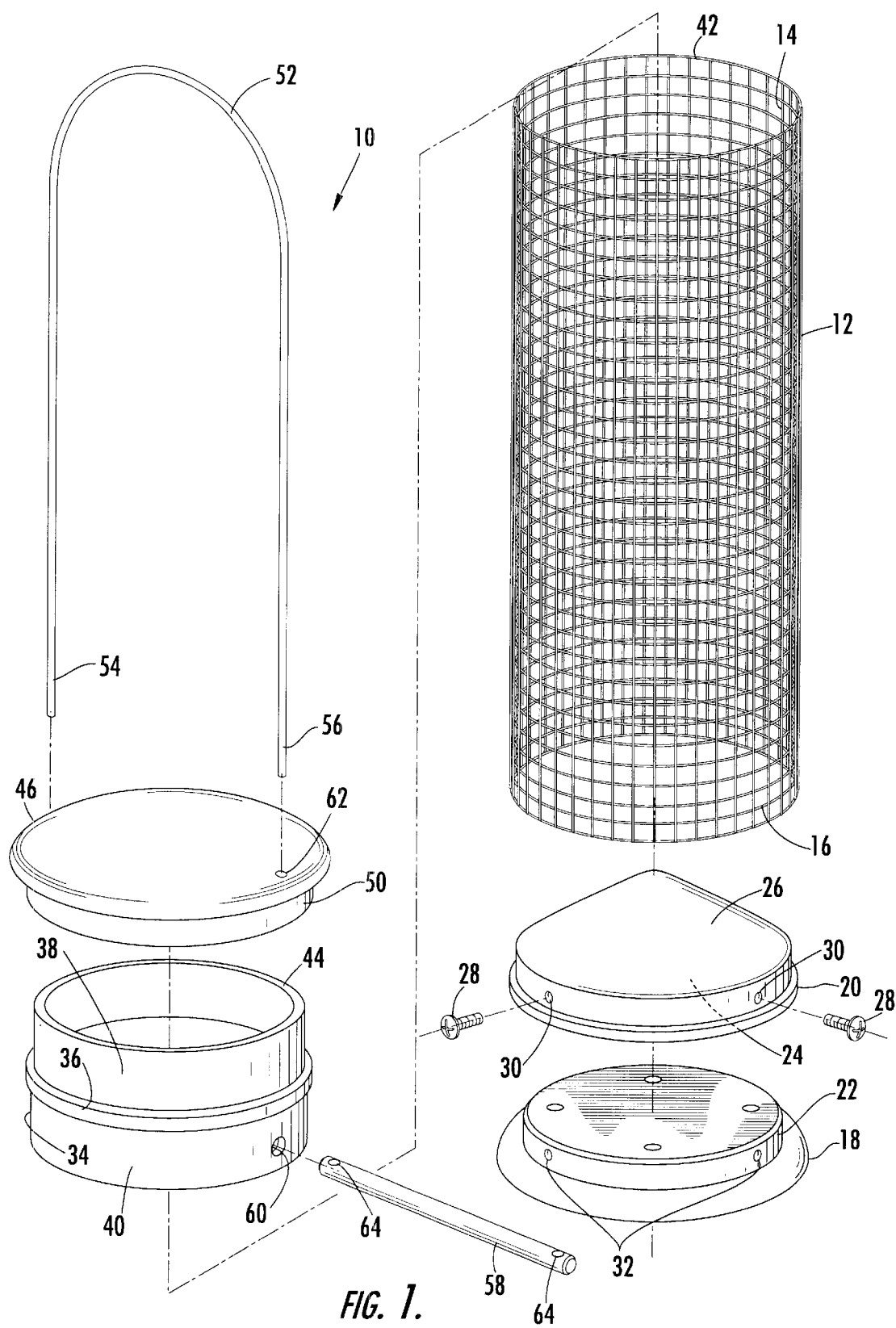
FIG. 1 is an exploded perspective view of the improved peanut feeder of the present invention.
Figure 2:
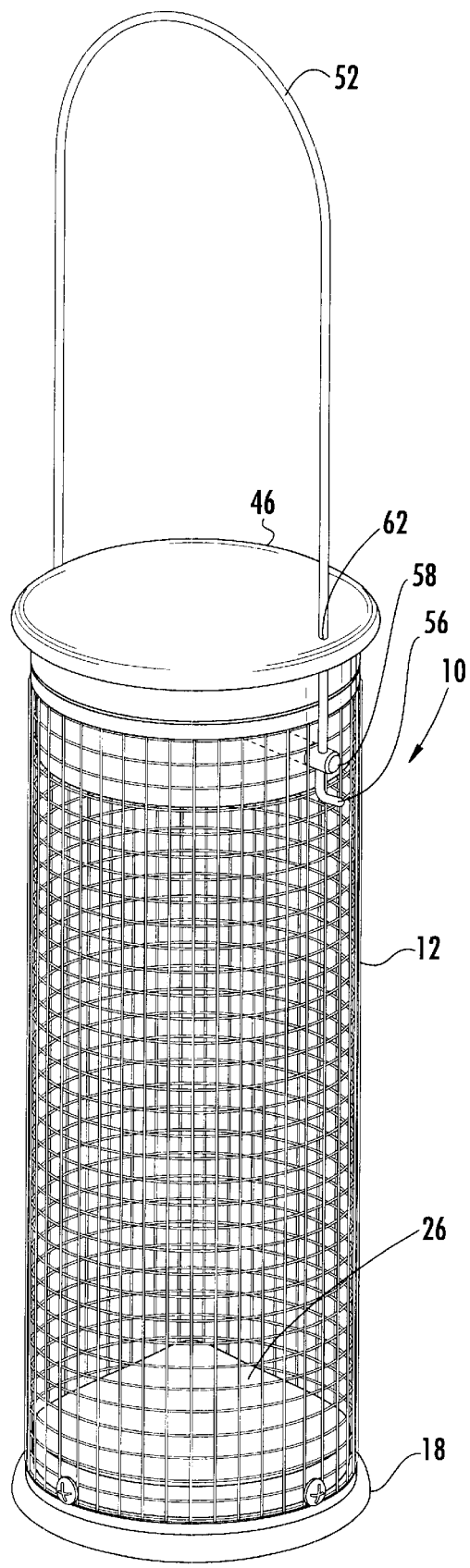
FIG. 2 is an assembled perspective view of the improved peanut feeder of FIG. 1.

Referring first to FIG. 1, an exploded perspective view of the improved peanut feeder 10 of the present invention is shown in detail. The feeder 10 includes a main body 12 which is preferably a wire mesh arranged in a cylindrical configuration to form a tube with a top open end 14 and a bottom open end 16. Referring to FIGS. 1 and 2, a base member 18, otherwise known as a bottom cap, was nested from below into a seed deflector 20 which is, in the preferred embodiment, a hollow structure. The base member 18 includes a boss 22 which receives the hollowed out portion, forming a bottom seat 24, of the seed deflector 20. The seed deflector 20 includes a conical top surface 26 to urge seed toward the periphery of the main body 12.

The bottom cap 18 and seed deflector 20 are installed into the bottom open end 16 of the main body 12 and retained in place by threaded fasteners 28 which are routed through an opening in the mesh main body 12 and through pass-thru holes 30 in the seed deflector 20 and into female threaded holes 32 in the base member 18. The bottom open end 16 of the main body 12 is thus closed and can effectively retain feed, such as peanuts therein. It should be understood that the base member and seed deflector configuration, as well as the method for interconnection of such members is shown by way of example and that other base and seed deflector configurations may be employed and still be within the scope of the present invention. For example, the seed deflector 20 may be omitted and other attachment fasteners may be used instead of the threaded fasteners 28 shown in the preferred embodiment shown in FIGS. 1 and 2.

Figure 3:
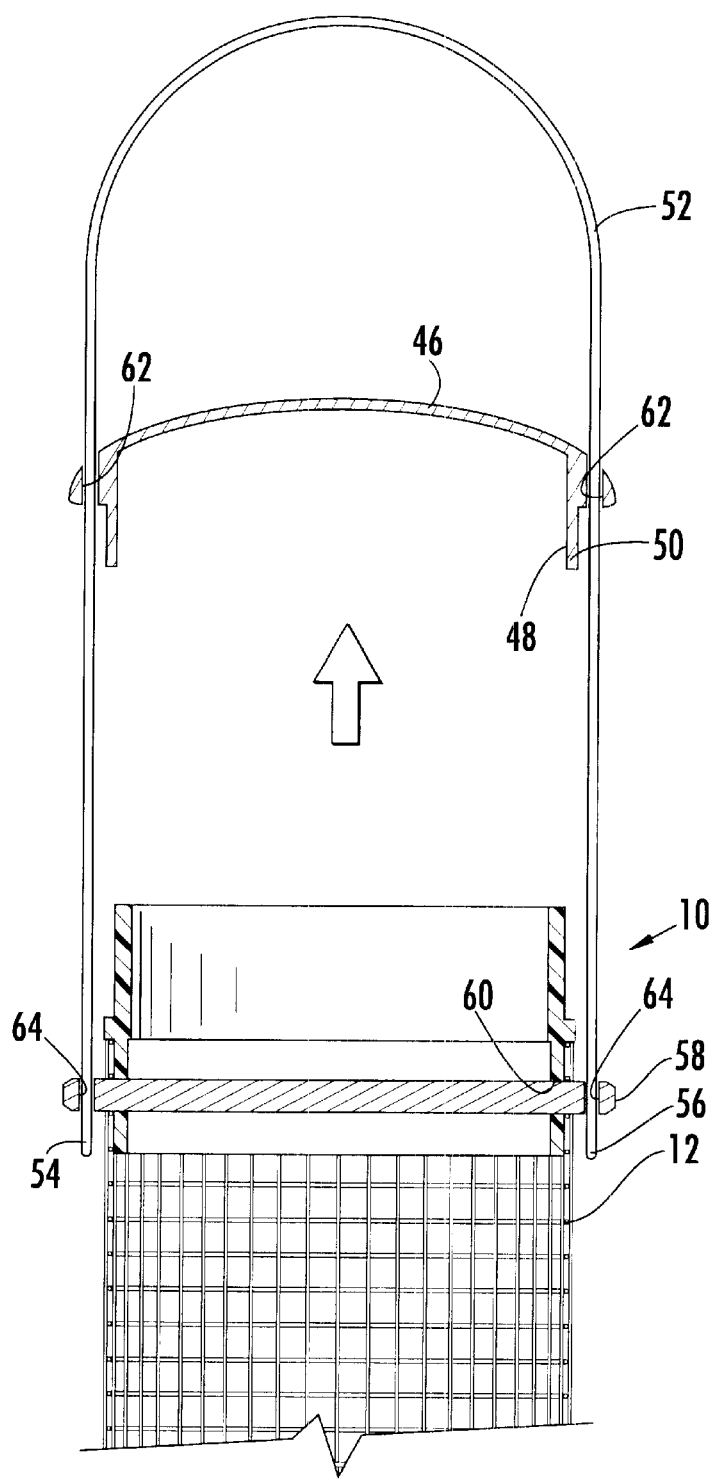
FIG. 3 is a partial cross-sectional view of the peanut feeder of FIG. 1 prior to installation of the top cap.

In accordance with the present invention, an adapter sleeve 34, preferably made of plastic, is inserted into the top open end 14 of the main body 12 of the feeder 10. More specifically, the adapter sleeve 34 includes, preferably, a circumferential flange 36 which divides it into a top portion 38 and a bottom portion 40. The adapter sleeve 34 is inserted into the top open end 14 of the main body 12 so that the bottom portion 40 of the adapter sleeve 34 fits within the top open 14 end of the main body 12. Further, the outside diameter of the bottom portion 40 of the adapter sleeve 34 is slightly smaller than the inner diameter of the main body 12 to permit easy installation of the adapter sleeve 34 into the top open end 14 of the main body 12. As best seen in FIG. 3, the top open end 14 of the main body 12 provides a receiving seat for the bottom portion 40 of the adapter sleeve 34. Moreover, the circumferential flange 36 rests on the top edge 42 of the main body 12 to prevent the adapter sleeve 34 from sliding further downwardly into the main body 12 of the feeder 10. As a result, the adapter sleeve 34 is maintained in place at the top open end 14 of the main body 12 of the feeder 10.

In accordance with the present invention, the adapter sleeve 34 effectively covers the top edge 42 of the top open end 14 of the main body 12 which is typically very sharp because the main body 12 is commonly made from a metal wire mesh and clipped to the desired length. The adapter sleeve 34 of the present invention isolates the sharp and dangerous top edge 42 from the user and provides a new exposed upper edge 44 which is the top edge of the upper portion 38 of the adapter sleeve 34. It is this top edge 44 of the upper portion 38 of the adapter sleeve 34 which is exposed to the user and presented for receipt of a top cap 46, as will be described below, for enclosing the feeder.

Figure 4:
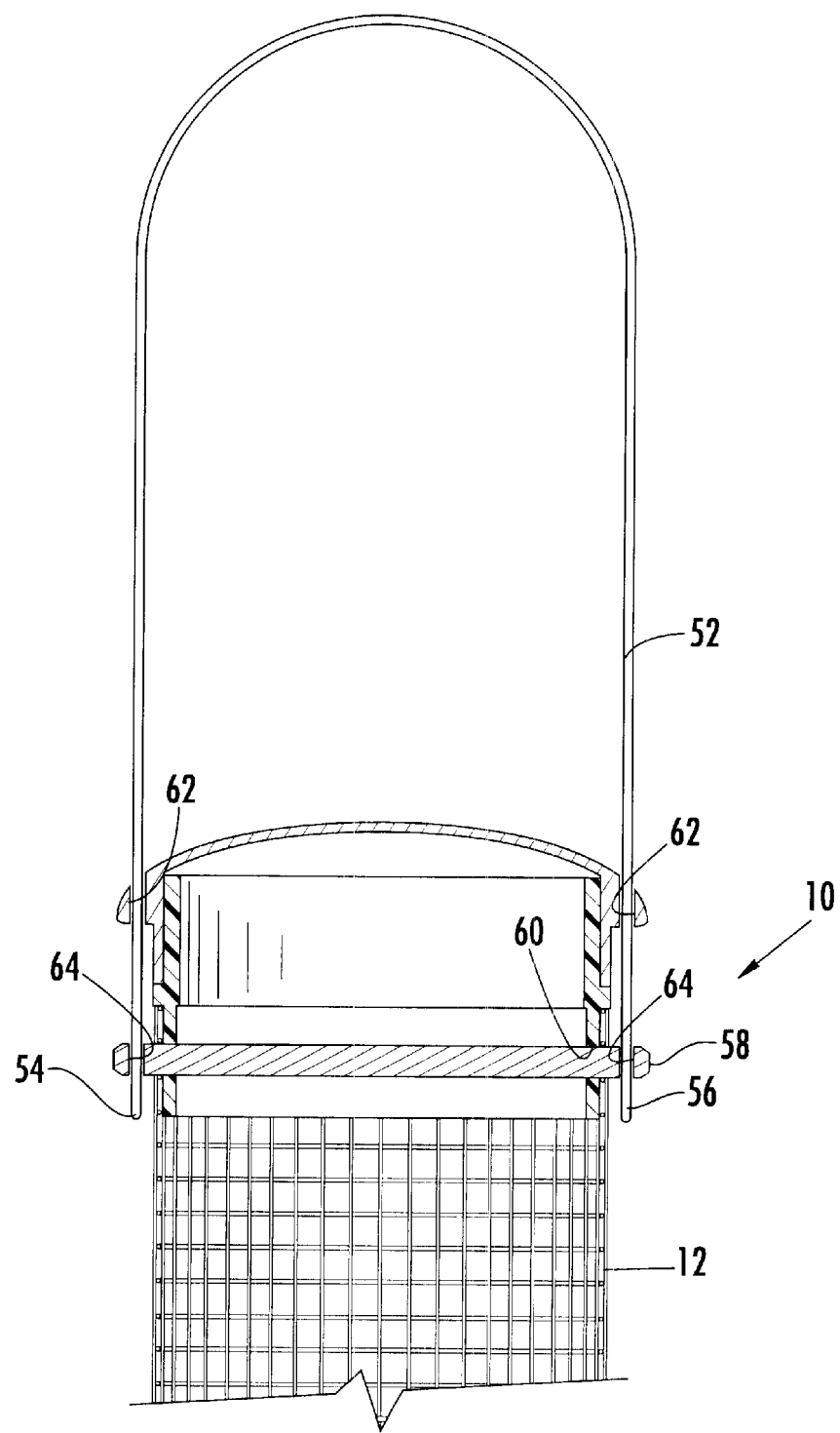
FIG. 4 is a partial cross-sectional view of the peanut feeder of FIG. 1 with top cap installed.

As shown in FIGS. 1, 2, and 4, the top cap 46 includes an internal recess 48 which is of a complimentary shape to the upper portion 38 of the adapter sleeve 34. A downwardly depending wall 50 of the top cap 46 defines this recess 48 to embrace the upper portion 38 of the adapter sleeve 34. In that connection, the top cap 46 may be easily placed over the upper portion 38 of the adapter sleeve 34 to effectively close the top open end 14 of the main body 12 of the feeder 10 to protect feed contained therein.

In addition, as shown in FIGS. 1–4, a bail wire 52, having two opposing free ends 54 and 56, is provided to facilitate the hanging of the feeder 10 in a desired location. In the preferred embodiment of the present invention, a bail pin 58 is routed through apertures in the mesh main body 12 and through thru holes 60 in the bottom portion 40 of the adapter sleeve 34. As best seen in FIGS. 3 and 4, the installation of the bail pin 58 prevents the adapter sleeve 34 from being removed from the top open end 38 of the main body 12 of the feeder 10. As shown in FIGS. 1 and 2, the free ends 54, 56 of the bail wire 52 are inserted through respective thru holes 62 in the top cap 46 and again through thru holes 64 in the bail pin 58. Once the free ends 54, 56 of the bail wire 52 are routed through the bail pin 58, they are bent slightly to prevent unwanted complete removal of the bail wire 52 from the feeder 10 while still allowing for the top cap 46 to slide up and down along the bail wire 52 for access to the interior of the main body 12 of the feeder 10.

It is envisioned that the improved silo bird feeder of the present invention is assembled as shown in FIG. 2 in preparation for use. The adapter sleeve 34 is permanently installed into the top open end 14 of the main body 12 of the feeder 10 as described above for filling of the feeder 10. As shown in FIG. 3, the top cap 46 is removed from the upper portion 38 of the adapter sleeve 34 by sliding the top cap 46 along the bail wire 52. The top cap 46 may then be further moved to the side of the main body 12 by rotation of the bail pin 58 to facilitate direct access to the interior of the main body 12 of the feeder 10. With the top cap 46 removed, feed, such as peanuts, is easily loaded into the main body 12 of the feeder 10. Once the desired amount of feed is installed, the top cap 46 is slid along the bail wire 52 and into communication with the adapter sleeve 34 so that the upper portion 38 of the adapter sleeve 34 rests within the inside recess 48 of the top cap 46. The filled feeder 10 is then ready for display and subsequent feeding therefrom.

It should be understood that the present invention is shown, by way of example, as a cylindrical configuration. Any other configurations, such as a square main body 12, would also be considered to be within the scope of the present invention. The bottom cap 18, optional seed deflector 20, adapter sleeve 34, and top cap 46 are be easily reconfigured to accommodate the main body 12 having a square configuration.

Further, the adapter sleeve 34 of the present invention is shown to include a substantially tubular configuration, whether circular or square in cross section, however, it may be in the configuration of a frame as opposed to a solid tube and may engage with the inner surface of main body 12, as shown in FIGS. 1–4, or may engage with the outer surface of the main body 12. In summary, in accordance with the present invention, the adapter sleeve 34 effectively covers the sharp top edge 42 of the main body 12 and protects it from the user while providing an alternative mount to receive the top cap 46 to enclose the feeder.

In addition to protecting the user from a sharp edge 42 of the main body 12, the adapter sleeve 34 provides additional structural rigidity to the entire bird feeder 10 resulting in an overall superior and solid configuration. Commonly, peanut or silo type bird feeders employ a mesh main body 12 which is typically made of metal wire. This wire is very flexible which enables the body to collapse easily. For example, during the filling operation of a prior art feeder, the user typically holds the feeder by the main body 12 and during that grasping, can easily cause the feeder 10 to go out of its precise round shape thus making it very difficult to reinstall the top cap 46 onto the top portion of the feeder 10. In accordance with the present invention, the installed adapter sleeve 34 ensures that the mesh main body 12 of the feeder 10 maintains a virtually precise cylindrical configuration to greatly facilitate removal and installation of the top cap 46. The installation of the adapter sleeve 34 at the top open end 14 of the main body 12 and the combination base member 18 and seed deflector 20 installed at the bottom open end 16 of the main body 12 provides for structural reinforcement to ensure that the feeder 10 of the present invention retains its desired shape at all time.

While the main body 12 is preferably a wire mesh material, other materials may be employed and still be within the scope of the present invention. For example, a reinforced plastic mesh or die cut sheet metal may also be used depending on the application of the feeder 10. Further, the bail wire 52, top cap 46 and bottom cap 18 are also preferably made of a metallic material for durability but may also be made of other materials, such as plastic. The seed deflector 20 is preferably plastic, however, may be made of other materials such as metal. Finally, the adapter sleeve 34 is preferably made of plastic for ease of manufacture using, for example, an injection molding process. Such a plastic injection molded part ensures that its upper edge 44, which will be exposed to the user, is very smooth so as to not result in injury to the user. However, the adapter sleeve 34 may be made out of metal, such as by a casting process, to form the desired configuration.

It would be appreciated by those skilled in the art that various changes and modifications can be made to the illustrated embodiments without departing from the spirit of the present invention. All such modifications and changes are intended to be covered by the appended claims.

What is claimed is:

1. An improved bird feeder, comprising:

a tubular main body having a top open end; a bottom open end and an inner surface; said top open end including a top edge and said bottom open end including a bottom edge; said tubular main body being made of wire mesh material;

a bottom cap in communication with said bottom open end and said bottom edge of said tubular main body thereby closing said bottom open end;

a tubular adapter sleeve having a circumferential flange with a top portion positioned above said circumferential flange and a bottom portion positioned below said circumferential flange; said tubular adapter sleeve being positioned in said tubular main body with said bottom portion of said tubular adapter sleeve being positioned in said top open end of said tubular main body and in communication with said inner surface of said tubular main body; said flange being in communication with said top edge of said top open end of said tubular main body; and a top cap defining a tubular adapter sleeve receiving seat; said top cap being removably engageable with said top portion of said tubular adapter sleeve; said top portion being in communication with said tubular adapter sleeve receiving seat thereby closing said top open end of said tubular main body.

2. The bird feeder of claim 1, wherein said bottom cap is secured to said tubular main body by fasteners.

3. The bird feeder of claim 1, further comprising:

a bail wire connected to said tubular main body.

4. The bird feeder of claim 1, further comprising:

a pin, having a first free end and a second free end, routed through said tubular main body and said tubular adapter sleeve;

a bail wire, having a first free end and a second free end, routed through opposing first and second apertures positioned through and defined by said top cap into respective connection with said first free end of said pin and said second free end of said pin;

said top cap being freely movable on said bail wire with said first free end of said bail wire and said second free end of said bail wire being respectively slidable through said first aperture and said second aperture of said top cap.

5. An improved bird feeder, comprising:

a main body having a top open end; a bottom open end and an inner surface; said top open end including a top edge and said bottom open end including a bottom edge;

a bottom cap in communication with said bottom open end and said bottom edge of said main body thereby closing said bottom open end;

an adapter sleeve partially extending within said main body and having an outer surface; said outer surface of said adapter sleeve in contact said top open end of said main body with said inner surface of said main body with a portion of said adapter sleeve extending above said top edge; and a top cap being removably engageable with said outer surface of said portion of said adapter sleeve extending above said top edge portion of said tubular adapter sleeve.

6. An improved bird feeder, comprising:

a tubular main body having a top open end and a bottom open end; said top open end including a top edge and said bottom open end including a bottom edge; said tubular main body being made of wire mesh material;

a bottom cap in communication with said bottom open end and said bottom edge of said tubular main body thereby closing said bottom open end;

a tubular adapter sleeve having a circumferential flange with a top portion positioned above said circumferential flange and a bottom portion position below said circumferential flange; said tubular adapter sleeve being positioned in said tubular main body with said bottom portion of said tubular adapter sleeve being positioned in said top open end of said tubular main body; said flange being in communication with said top edge of said top open end of said tubular main body;

a top cap defining a tubular adapter sleeve receiving seat; said top cap being removably engageable with said top portion of said tubular adapter sleeve thereby closing said top open end of said tubular main body;

a pin, having a first free end and a second free end, routed through said tubular main body and said tubular adapter sleeve;

a bail wire, having a first free end and a second free end, routed through opposing first and second apertures positioned through and defined by said top cap into respective connection with said first free end of said pin and said second free end of said pin; and said top cap being freely movable on said bail wire with said first free end of said bail wire and said second free end of said bail wire being respectively slidable through said first aperture and said second aperture of said top cap.

7. The bird feeder of claim 6, wherein said bottom cap is secured to said tubular main body by fasteners.

8. The bird feeder of claim 6, further comprising:

a bail wire connected to said tubular main body.

* * * * *